United States Patent Office 3,756,994
Patented Sept. 4, 1973

3,756,994
VINYL AROMATIC AMINIMIDES AND POLYMERS THEREOF
Billy M. Culbertson, Savage, William J. McKillip, Minneapolis, and Edward A. Sedor, Bloomington, Minn., assignors to Ashland Oil, Inc., Ashland, Ky.
No Drawing. Original application Aug. 23, 1967, Ser. No. 662,571, now Patent No. 3,641,145. Divided and this application Sept. 13, 1971, Ser. No. 180,113
Int. Cl. C08f 15/00; C08g 22/18
U.S. Cl. 260—82.1                                   9 Claims

ABSTRACT OF THE DISCLOSURE

Vinyl aromatic aminimides are prepared from vinyl aromatic acids or derivatives thereof. The vinyl aromatic aminimide can be homopolymerized and copolymerized to result in functional group-containing polymeric products capable of thermosetting. The vinyl aromatic aminimides have the general formula

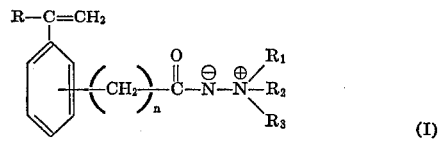

(I)

wherein R is a hydrogen, methyl, or halogen; $n$ is zero or one and $R_1$, $R_2$, and $R_3$ are hydrocarbon radicals and $R_1$ and $R_2$ can be combined to form a heterocyclic ring with the nitrogen.

---

This is a division of application Ser. No. 662,571 filed Aug. 23, 1967 and now U.S. Pat. 3,641,145, issued Feb. 8, 1972.

The present invention relates to novel vinyl aromatic aminimides and to polymers thereof. In another aspect, the present invention relates to processes for the preparation of the vinyl aromatic aminimides, their polymerization, and the subsequent chemical modification of such polymers.

The vinyl aromatic aminimides of the present invention have the general formula

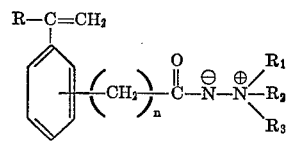

wherein R is a hydrogen, methyl, or halogen; $n$ is zero or one; $R_1$ and $R_2$ are aliphatic or aryl hydrocarbon radicals having from 1 to 22 carbon atoms or radicals in which $R_1$ and $R_2$ are combined to form heterocyclic rings with the nitrogen; and wherein $R_3$ is a saturated or unsaturated aliphatic hydrocarbon radical of 1 to 22 carbon atoms. The term "aryl" as employed herein is meant to define an aromatic radical in which the unsatisfied valence is at a carbon atom of the aromatic nucleus.

The aminimides of the present invention are prepared by reacting a hydrazine with a vinyl aromatic acid chloride in the presence of an inert organic solvent, subsequently reacting the hydrazine with a quaternizing agent to form the quaternary ammonium salt, and then dehydrohalogenating the reaction product in the presence of a base in accordance with the following reaction scheme

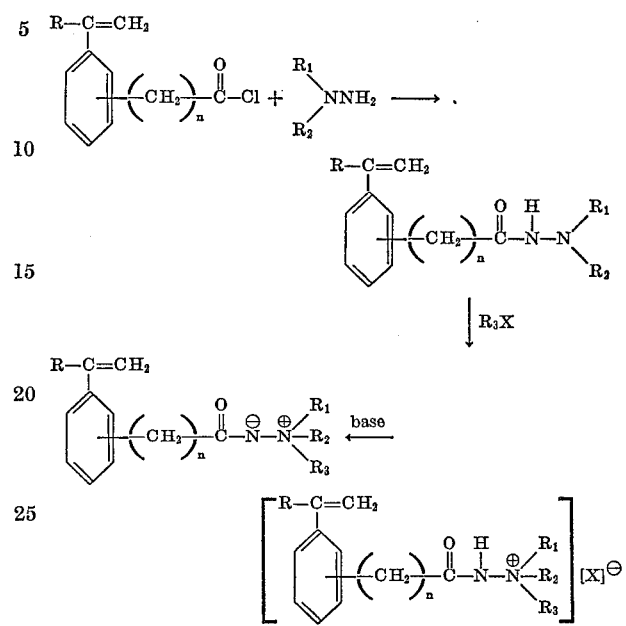

in which R, $R_1$, $R_2$, and $R_3$, and $n$ have the above-indicated meaning, and X can be any suitable anion.

The unsymmetrical hydrazine employed in the formation of the aminimides of the present invention can be obtained by the reaction of a halo-amine with a tertiary amine, resulting in the hydrazinium salt which is reacted with a base to form the hydrazine. Since the reaction is well-known in the art, no further description is deemed necessary.

The unsymmertical hydrazine is reacted with the vinyl aromatic acid chloride in the presence of an inert solvent such as a low boiling hydrocarbon solvent, commercially available as "Skelly F," dimethyl sulfoxide, acetonitrile, dioxane, tetrahydrofuran, ethers, e.g. diethyl ether, glymes (i.e., dimethyl ethers of ethylene glycol), and the like. The solvent is employed in sufficient amounts to allow the formation of a fluid mixture. Preferably, the reaction is conducted at ambient temperature and pressure conditions, although higher and lower temperatures or higher and lower pressures can be employed if called for by the reagents employed in the particular synthesis. In general, the reaction conditions employed should provide for the removal of the by-product HCl. Although the reaction proceeds rapidly, it is generally preferred to employ longer reaction times to assure completion of the reaction and thereby higher yields of the vinyl aromatic hydrazine. An excess of either reagent may be employed, although such is not necessary in view of the quantitative yields obtained by the use of nearly equivalent amounts of the acid chloride and the hydrazine. The vinyl aromatic hydrazine may precipitate out of the solvent, depending on the solvent. If the vinyl aromatic hydrazine does not precipitate, it can be readily isolated by evaporation of the solvent.

The vinyl aromatic hydrazine is quaternized with a compound having the general formula

R₃X wherein R₃ is a saturated or unsaturated aliphatic hydrocarbon radical and preferably a lower alkyl radical, and X can be any quaternizing anion but is preferably an aryl sulfonate radical or a halogen radical such as chlorine, bromine or iodine.

Suitable quaternizing agents, therefore, include methyl chloride, methyl bromide, ethyl chloride, methyl iodide, propyl chloride, ethyl bromide, methyl benzene sulfonate, methyl toluene sulfonate (methyl tosylate), and ethyl toluene sulfonate.

The reaction of the vinyl aromatic hydrazine with the quaternizing agent is preferably conducted in the presence of a solvent which is generally of the type of inert solvent hereinabove indicated. Reaction temperatures will vary from room temperature to elevated temperatures which do not cause the decomposition of the reagents or products.

The hydrazinium salt is dissolved in an alcohol such as methanol, and dehydrohalogenated to the aminimide by titrating with an alcoholic base to a neutral end point. Preferred bases are the alkali metal bases such as sodium hydroxide or potassium hydroxide. The aminimide is isolated by precipitating the alkali metal salt and evaporating the solvent.

The unsymmetrical hydrazine, which is reacted with the vinyl aromatic acid chloride to form the vinyl aromatic hydrazine, has the general formula

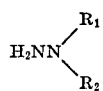

wherein R₁ and R₂ have the above-indicated meaning.

Preferably, R₁ and R₂ are lower alkyl groups, phenyl and substituted phenyl groups, and such heterocyclic ring compounds as pyrrolidine, pyrrole, pyrroline, and piperidine. Specific examples of the unsymmetrical hydrazines employed include dimethylhydrazine, diethylhydrazine, methyl-ethylhydrazine, dibutylhydrazine, N - amino-2-phenyl pyrrolidine, phenyl-methylhydrazine, diphenylhydrazine, and dicresylhydrazine.

The vinyl group of the aromatic acid chloride can contain substituents on the α-carbon normally found in polymerizable substituted styrenes such as methyl or halogen and particularly chlorine. The acyl halide group can be directly bonded to the benzene nucleus or can be bonded to the benzene nucleus by means of a methylene group. The vinyl group further can be ortho, meta, or para to the acyl halide group. Thus, suitable vinyl aromatic acid chlorides include 4-vinylbenzoyl chloride, 3-vinylbenzoyl chloride, 2-vinylbenzoyl chloride, 2-(α-methylvinyl)benzoyl chloride, 3-(α-methylvinyl)benzoyl chloride, 4-(α-methylvinyl)benzoyl chloride, 2-(α-chlorovinyl)benzoyl chloride, 3-(α-chlorovinyl)benzoyl chloride, 4-(α-chlorovinyl)benzoyl chloride, (2-vinylphenyl)acetyl chloride, (3-vinylphenyl)acetyl chloride, (4-vinylphenyl)acetyl chloride, 4 - (α - methylvinyl)phenylacetyl chloride, 3-(α-methylvinyl)phenylacetyl chloride, and 2-(α-methylvinyl)phenylacetyl chloride.

Aminimides which can be prepared by the described process include trimethylamine-4-vinyl-benzimide,
trimethylamine-3-vinyl-benzimide,
trimethylamine-2-vinyl-benzimide,
dimethylethylamine-4-vinyl-benzimide,
triethylamine-4-vinyl-benzimide,
dipropylmethylamine-4-vinyl-benzimide,
tributylamine-4-vinylbenzimide,
triethylamine-3-vinyl-benzimide,
diethylmethylamine-2-vinyl-benzimide,
trimethylamine-4-(2-propenyl)benzimide,
trimethylamine-3-(2-propenyl)benzimide,
trimethylamine-2-(2-propenyl)benzimide,
triethylamine-4-(2-propenyl)benzimide,
trimethylamine-4-vinylphenyl-acetimide,
trimethylamine-3-vinylphenyl-acetimide,
trimethylamine-2-vinylphenyl-acetimide,
triethylamine-4-vinylphenyl-acetimide,
methylethylamine-4-vinylphenyl-acetimide,
trimethylamine-4-(2-propenyl)phenyl acetimide,
trimethylamine-3-(2-propenyl)phenyl-acetimide, and
trimethylamine-2-(2-propenyl)phenyl-acetimide.

The novel vinyl aromatic aminimides of the present invention can be polymerized through addition to the double bond. Although the reactivity of the vinyl group in the aminimide appears to have a reactivity in polymerization similar to that of the unsubstituted vinyl aromatic monomer, the presence of the aminimide group in the molecule alters, to a certain degree, the methods employed for polymerization of these monomers as compared to the unsubstituted vinyl aromatic monomer. Thus, the aminimide group is sensitive to elevated temperatures above about 150° C., as will be explained in greater detail hereinbelow. Hence, it is generally desirable to employ polymerization temperatures between room temperature and 150° C. and therefore also a free radical-forming polymerization initiator such as a peroxide. The initiators are of the conventional type and used in conventional concentrations. Additionally, the monomer as well as the homopolymer is generally soluble in polar organic solvents such as alcohols, esters, ethers and ketones, as well as mixtures of such polar solvents with water. Hence, contrary to the unsubstituted aromatic vinyl monomers, the aminimides of the present invention can be homopolymerized in such polar media. Except for these differences, the polymerization techniques developed for vinyl aromatic monomers are equally applicable to the monomers of the present invention. This is particularly true for the copolymerization of the described aminimides.

The aminimides can be copolymerized in all ratios with unsubstituted vinyl aromatic monomers such as styrene, α-methyl styrene, α-chloro styrene and ring-halogenated styrenes, and such monomers as are capable of copolymerization with styrene such as acrylonitrile, butadiene, and acrylic monomers. The term "acrylic monomers" is defined as including monomers containing the structure

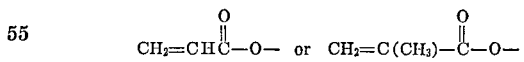

Acrylic monomers useful for such purpose include ethyl acrylate, methyl acrylate, butyl acrylate, methyl methacrylate, ethyl methacrylate, hydroxy-substituted alkyl acrylates and methacrylates, alkoxy-substituted alkyl acrylates and methacrylates, acrylic acid, methacrylic acid, glycidyl acrylate, glycidyl methacrylate, and the like. The copolymerization can be conducted in bulk or in a common solvent at temperatures of 25° to 120° C. using a peroxide, an azo-bis-nitrile, or similar free radical initiator. Instead of polymerizing the aminimide directly, the vinyl aromatic hydrazinium salt can be polymerized by the methods described and subsequently converted to the polyaminimide by the methods described for the conversion of the monomer.

The utility of the polymers and copolymers of the present invention is based on their ability to be converted to polyisocyanates which have a well-established utility in the formation of polyurethanes. The conversion is accomplished by pyrolysis or photolysis. The conversion is illustrated by the following equation

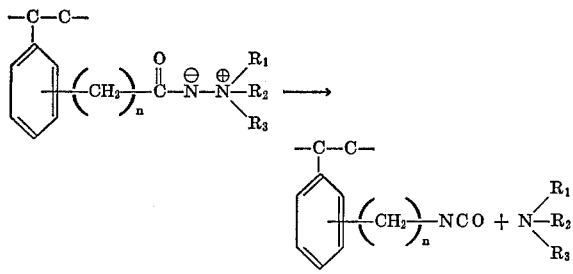

in which $R_1$, $R_2$, $R_3$ and $n$ have the above-indicated meaning.

The tertiary amine by-products are well known catalysts in the polymerization of isocyanates with hydroxyl-terminated polyesters, polyethers and polyols.

Pyrolysis of the aminimides can be conducted by heating the aminimide to temperatures above about 150° C., and results in the formation of the isocyanate and a tertiary amine by the above equation.

Although it is possible to convert the vinyl aromatic aminimide of the present invention to the isocyanate prior to polymerization, it is generally preferred to convert the aminimide subsequent to polymerization in view of the greater chemical stability of the aminimide group as compared to the isocyanate group. This is particularly significant in the formation of urethane linkages in the sense that the aminimide can be admixed with polyhydroxy compounds and form a stable system. On heating such system, the aminimide is converted to the isocyanate, which reacts with the polyhydroxy compound, while simultaneously releasing a tertiary amine, which acts as a catalyst for the reaction. It will be apparent, therefore, that the incorporation of a small number of the novel aminimide monomers into an otherwise unreactive polymer (i.e., containing no Zerewitinoff hydrogen) converts such polymer chains into a crosslinkable system which can be crosslinked with a curing agent, i.e., an agent which contains two or more Zerewitinoff hydrogens. The meaning of the term "Zerewitinoff hydrogen" is well-established in the polyurethane art and includes, in particular, the hydroxyl group. The polymer systems of the present invention have the additional advantages of being stable at temperatures below 150° C. in the presence of compounds containing a Zerewitinoff hydrogen. Polymers which contain a higher number of aminimide units have utility in polyurethane systems which are well-known in the art. The vinyl aromatic aminimide can furthermore be converted to the isocyanate and then employed directly in polyurethane systems, thereby introducing reactive double bonds into the system. The foregoing discussion of the utility of the vinyl aromatic aminimides of the present invention is not intended to limit the utility of the vinyl aromaic aminimides to such, since many other applications will be apparent to those skilled in the art from the dual reactivity of the vinyl aromatic aminimides.

The formation of the novel aminimides, their polymerization and their conversion to isocyanates, as well as the reactivity of such isocyanates, is further illustrated by the following examples in which all units of quantity are by weight unless otherwise stated.

EXAMPLE 1

4-vinyl benzoyl acid chloride was prepared from 5 g. (0.034 mole) of 4-vinyl benzoic acid and 6 ml. of thionyl chloride. On solution in a hydrocarbon solvent, commercially available as "Skelly F," filtration and removal of solvent, 5.4 g. (88%) of purified 4-vinyl benzoyl acid chloride was obtained.

The acid chloride was dissolved in 10 ml. of "Skelly F" and added dropwise to a solution of 6 g. of 1,1-dimethylhydrazine in 100 ml. of "Skelly F" maintained at 10° C. After addition (35 minutes), the mixture was stirred at room temperature for 19 additional hours.

The mitxure was filtered and collected solid washed with "Skelly F" and then dried. The solid was washed with water to remove the 1,1-dimethylhydrazine hydrocholoride and the solid was dried under reduced pressure. A yield of 4.14 g., M.P. 122°–125° C. (68%) of 1,1-dimethyl-2-(4-vinylbenzoyl)hydrazine was obtained.

An alternate method for preparing the hydrazine is as follows. To a stirred solution of 15 ml. (21 g. 0.35 mole) of 1,1-dimethylhydrazine dissolved in 20 ml. of anhydrous ether is added dropwise a solution of 12.4 g. (0.084 mole) of 4-vinylbenzoyl chloride. The mixture is kept between 15°–25° C. throughout the addition and after addition is stirred an additional 20 hours at room temperature. The mixture is filtered, and the white solid washed with water and dried. The solid (5.12 g., 32%) is recrystallized from benzene, M.P. 125°–126° C. Infrared and nuclear magnetic resonance analysis confirms the structure of the product to be 1,1-dimethyl-2-(4-vinylbenzoyl)hydrazine.

In a 300 ml. flask is placed 5 g. of 1,1-dimethyl-2-(4-vinylbenzoyl)hydrazine, 6 g. of methyl tosylate, and 125 ml. of anhydrous acetonitrile. The solution is heated to reflux and a trace of hydroquinone added after one-half hour. The reflux is continued for 5 additional hours, the solution is cooled to room temperature then permitted to stand for an additional 12 hours at room temperature.

The crystals that form are filtered (5.3 g.) On reducing the volume of the mother liquor, an additional 2.9 g. of product is obtained. Recrystallization from methanol-benzene yields white crystals, M.P. 166°–168° C., total yield 8.1 g. (82%). The infrared and nuclear magnetic resonance analyses confirm the structure of the product to be 1,1,1 - trimethyl-2-(4-vinylbenzoyl)hydrazinium tosylate.

*Analysis.*—Calculated for $C_{19}H_{24}N_2O_4S$ (percent): C, 60.61; H, 6.44%; N, 7.44. Found (percent): C, 60.78, 60.90; H, 6.53, 6.56; N, 7.43, 7.47.

A solution of 7.2 g. (0.0196 mole) of 1,1,1-trimethyl-2-(4-vinylbenzoyl)hydrazinium tosylate in 35 ml. of anhydrous methanol is titrated to the phenolphthalein end point with 1.108 N. alcoholic NaOH requiring 16.9 ml., 96% theoretical base. The mixture is chilled in an ice bath, sodium tosylate is filtered from the solution and the methanol removed on a rotary evaporator. Chloroform is added to the residue and the solution is dried over sodium sulfate and filtered. Removal of the chloroform solvent yields a solid which is dissolved in hot benzene. Cyclohexane is added to the hot solution until a gummy yellow material precipitates. After decanting the hot solution, more cyclohexane is added until turbid. Cooling results in white, fluffy needles, 3.30 g. (79.5%), M.P. 122°–124° C. Nuclear magnetic resonance and infrared analysis confirm the structure of the product to be trimethylamine-4-vinyl-benzimide.

*Analysis.*—Calculated for $C_{12}H_{16}N_2O$ (percent): C, 70.57; H, 7.90; N, 13.72. Found (percent): C, 70.68; 70.48; H, 8.02, 7.99; N, 13.44, 13.50.

The aminimide is soluble in water, methanol, ethanol, chloroform, and benzene, and is insoluble in pentane, cyclohexane, and carbon tetrachloride.

EXAMPLE 2

Into a raction flask is charged 100 parts of water, 5 parts of the aminimide of Example 1, 0.4 part of azo-bis-isobutyronitrile, commercially available as "VAZO," and enough acetone to solubilize the mixture. The solution is heated at reflux for 16 hours, cooled, and diluted with acetone. The precipitated polymer is collected, washed with acetone, and dried under reduced pressure.

Infrared analysis shows the polymer to substantially have a structure of repeating units having the formula

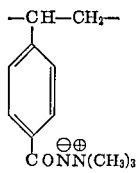

The polymer is soluble in water, methanol, and chloroform.

The polymer is heated to 200°–225° C. and a quantitative evolution of trimethylamine is obtained. Analysis of the resulting polymer confirms the conversion of the aminimide groups to isocyanate groups.

EXAMPLE 3

Into a reaction flask is charged 100 parts of methyl ethyl ketone, 2.5 parts of the aminimide of Example 1, 2.5 parts of styrene, and 0.4 part of the catalyst of Example 2. The solution is heated at 60° C. for 20 hours. On cooling, a water-soluble copolymer of styrene and trimethylamine-4-vinyl-benzimide is obtained.

EXAMPLE 4

The procedure of Example 3 is repeated employing 5 parts of the aminimide and 3 parts of methyl methacrylate. The resulting water-soluble copolymer of methyl methacrylate and trimethylamine - 4 - vinyl - benzimide evolves trimethylamine on heating to 190° C., said heating converting the aminimide groups to isocyanate groups.

EXAMPLE 5

The procedure of Example 3 is repeated using 2.5 parts of the aminimide and 2.5 parts of 2-hydroxypropyl methacrylate. The resulting copolymer is a glass-like solid. A 25% water solution of the polymer is drawn down on glass and treated for 12 hours at 200° C. The resulting film has a thickness of 10 to 15 mils and is hard and scratch-resistant. Infrared analysis of the film shows the loss of the originally present aminimide groups and the formation of urethane groups. The polymer is insoluble.

EXAMPLE 6

Into a 100 ml. serum bottle was charged under nitrogen 60 ml. of acetonitrile, 5.2 g. of styrene and 10.2 g. of trimethylamine-4-vinyl-benzimide corresponding to a 1:1 molar ratio of the comonomers. On addition of 0.15 g. of "VAZO" catalyst, the bottle was sealed and placed in a water bath at 70° C. for a period of four hours. The resulting solid copolymer was isolated by pouring the polymerization solution into ether, and was collected by filtration. On drying and removal of unreacted monomer, the polymer was found to contain about 69 mole percent of the benzimide, the remainder being styrene.

EXAMPLE 7

The procedure of Example 6 was repeated employing a monomer mixture of 20 mole percent trimethylamine-4-vinyl-benzimide and 80 mole percent methacrylonitrile. A copolymer containing about 23.4 mole percent of the benzimide and about 76.6 mole percent of methacrylonitrile as measured by titration was obtained.

EXAMPLE 8

The procedure of Example 6 was repeated employing a monomer mixture of 20 mole percent trimethylamine-4-vinyl-benzimide and 80 mole percent methyl methacrylate. A copolymer containing about 26.4 mole percent of the benzimide and about 73.6 mole percent of methyl methacrylate as measured by titration was obtained.

The foregoing examples have illustrated the preparation and polymerization of the novel vinyl aromatic aminimides and the post-polymerization reactions useful in the utilization of polymers prepared from the vinyl aromatic aminimides. It will be apparent that other vinyl aromatic aminimides included within the scope of the present invention can be similarly employed in the specific procedures illustrated in the examples. Similarly, other methods of polymerization and other comonomers can be employed, and will be apparent to those skilled in the art. Since many variations and embodiments are apparent to those skilled in the art, it is not intended to limit the foregoing disclosure to the particular features shown.

What is claimed is:

1. The addition polymer of the vinyl aromatic aminimide having the formula

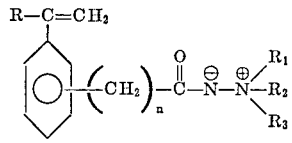

wherein R is a hydrogen, halogen, or methyl; $n$ is 0 or 1; $R_1$ and $R_2$ are aliphatic hydrocarbon radicals, aryl hydrocarbon radicals, or radicals in which $R_1$ and $R_2$ are combined to form heterocyclic rings with the nitrogen, and wherein $R_3$ is an aliphatic hydrocarbon radical of 1 to 22 carbon atoms.

2. The addition polymer of claim 1 wherein $R_1$, $R_2$, and $R_3$ are lower alkyl radicals or phenyl.

3. The addition polymer of claim 2 wherein the vinyl aromatic aminimide is the sole monomer.

4. The polymer of claim 2 wherein the vinyl aromatic monomer is copolymerized with styrene or an ethylenically unsaturated monomer capable of copolymerizing with styrene.

5. The polymer of claim 4 wherein the comonomer is styrene, acrylonitrile, butadiene, or an acrylic monomer.

6. The polymer of claim 2 wherein the vinyl aromatic aminimide has the formula

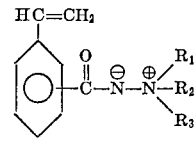

wherein $R_1$, $R_2$, and $R_3$ are lower alkyl groups.

7. The polymer of claim 6 wherein the aminimide group is in the para position.

8. The addition polymer of claim 6 wherein $R_1$, $R_2$, and $R_3$ are methyl.

9. The addition polymer of claim 1 wherein $R_1$, $R_2$, and $R_3$, each represent a $C_1$–$C_{22}$ alkyl radical, a phenyl radical, or a substituted phenyl group, and wherein $R_1$ and $R_2$ when taken collectively with the nitrogen atom to which they are attached, represent a heterocyclic ring selected from a group consisting of pyrrolidine, pyrrole, pyrroline, and piperidine.

References Cited
UNITED STATES PATENTS

| | | | |
|---|---|---|---|
| 2,468,713 | 4/1949 | Kropa et al. | 260—80 NC |
| 2,500,025 | 3/1950 | Dickey et al. | 260—77.5 BB |
| 3,242,138 | 3/1966 | Van Paesschen | 260—89.7 N |
| 3,450,673 | 6/1969 | McKillip | 251—182 |

DONALD E. CZAJA, Primary Examiner

M. J. WELSH, Assistant Examiner

U.S. Cl. X.R.

260—77.5 TB, 77.5 BB, 80 NC, 85.5 AM, 86.1 N, 88.1 PN, 88.3, 89.7 R, 89.7 S, 89.7 N, 93.5 R